3,027,354
ELASTOMERIC POLYURETHANES
Hans Holtschmidt, Koln-Stammheim, and Erwin Müller, Leverkusen, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Apr. 10, 1958, Ser. No. 727,554
Claims priority, application Germany Apr. 18, 1957
3 Claims. (Cl. 260—77.5)

This invention relates generally to the preparation of elastomeric polyurethanes and more particularly to an improved process for making elastomeric polyurethanes.

It has been proposed heretofore to make elastomeric polyurethanes from organic diisocyanates and linear or predominantly linear polythioethers having terminal hydroxyl groups. It has also been proposed that chain extender compounds having at least two hydrogen atoms capable of reacting with isocyanate groups and having a molecular weight of less than 500 may be used concurrently to produce linearly modified polythioethers in this polyaddition reaction. The linearly modified polythioether or modified prepolymer may then be cured by adding additional organic diisocyanate and, if necessary, cross-linking agents to produce an elastomeric polyurethane. Elastomeric polyurethanes prepared in this manner are more particularly characterized as having good resistance to chemicals and high elasticity as well as high resistance to cold temperatures. On the other hand, the low tensile strength and low breaking elongation of such elastomeric polyurethanes leaves much to be desired for uses in which these characteristics are essential. The reason for the poor physical properties is to be seen in the fact that the thioether-sulphur atoms exert a polymerizing influence on the free isocyanate groups present. When the linear or predominantly linear polythioethers containing terminal hydroxyl groups are reacted with the organic isocyanates the growth of the linear chains is repressed by branching of the chains due to the polymerizing influence. The tensile strength and breaking elongation of the elastomeric polyurethanes are seriously affected by this branching.

It is, therefore, an object of this invention to provide a new and novel method for making high molecular weight elastomeric polyurethanes. A further object of the invention is to provide a method for making elastomeric polyurethanes having improved physical properties. A more specific object of the invention is to provide a method for making elastomeric polyurethanes from polythioethers and organic polyisocyanates.

Generally speaking the foregoing objects and others are accomplished in accordance with this invention by reacting linear or predominantly linear polythioethers having terminal hydroxyl groups with organic polyisocyanates which have at least one alkyl, cycloalkyl or alkoxy substituent in the o-position of each isocyanate group of the organic polyisocyanate. If necessary the isocyanate modified polythioethers may be reacted with chain extender compounds having at least two hydrogen atoms capable of reacting with the terminal isocyanate groups and having a molecular weight of less than 500 to lengthen linearly the modified polythioether.

In general the invention may be carried out, for example, in two different methods. One such method involves reacting polythioethers having terminal hydroxyl groups with an excess of organic polyisocyanates. The organic polyisocyanates contain an alkyl, cycloalkyl or alkoxy substituent in the o-position to each of the free isocyanate groups present. Thereafter the isocyanate modified polythioethers are reacted with a chain extender compound having at least two hydrogen atoms capable of reacting with the free isocyanate groups present and having a molecular weight of less than 500. The compounds having reactive hydrogen atoms are compounds such as alkylene glycols and alkylene diamines, which may be added to the reaction product of the polythioether and shielded organic polyisocyanates. After being stirred for a short period of time the reaction mixture is then poured into molds and heated. An elastomeric material is formed on the completion of the heating reaction. By increasing the excess of organic polyisocyanate as for example, up to about 250%, it is possible to produce elastomeric materials having a high Shore hardness and a remarkable high elasticity.

Another method of carrying out the invention involves reacting polythioethers having terminal hydroxyl groups and an organic polyisocyanate having an alkyl, cycloalkyl or alkoxy group in the o-position to each of the free isocyanate groups. The polythioethers have a hydroxyl number of from about 10 to about 200, however, the preferred range is from about 30 to about 70. A chain extender compound may be added during the reaction of the organic polyisocyanate and polythioether. Such compounds have at least two hydrogen atoms capable of reacting with an isocyanate group and a molecular weight of less than 500. Examples of such compounds are, for example, water, alkylene glycols, amino alkylene alcohols, alkylene diamines, polyethers or polythioethers of low molecular weight and the like. The proportions of the chain extenders should be so chosen that the resulting storable material does not contain any free isocyanate groups. In other words, the sum of the reactive hydrogen atoms in the polythioether and in the chain extender component should be greater than the number of existing isocyanate groups. Various types of fillers may be admixed with the storage stable intermediate together with a further quantity of an organic polyisocyanate which is needed for the cross-linking and which may or may not be the organic diisocyanate used in the polythioether modifying reaction.

The present invention, therefore, makes it possible for elastomeric polyurethane materials to be prepared which have a high tensile strength and a high breaking elongation. Such elastomeric polyurethanes may be used for production of elements in which these characteristics are desirable. Thus the invention discloses elastomeric polyurethanes having important and desirable characteristics.

It is not intended that the present invention be restricted to any given theory, however, it is believed that the organic polyisocyanates having alkyl, cycloalkyl and alkoxy groups ortho to the isocyanate groups are shielded by these groups so that polymerization of the isocyanate groups will not take place. It has been found that polymerization does not take place at all or only to a very small degree while the isocyanate groups are shielded by these groups. However, the reactivity of the isocyanate groups with reactive hydrogen atoms of the polythioethers and chain extender compounds is not impaired.

Any suitable polythioether may be used in the invention. Examples of such suitable polythioethers are those having terminal hydroxyl groups and which contain sulphur and oxygen bridges in the molecular chain. The polythioethers may be obtained in a known manner, such as, for example, by thermal condensation in the presence of etherification catalysts. For example, thioether glycols and alkylene glycols may be condensed as well as other compounds which contain thioether groups. Examples of manufacturing processes for the polythioethers are described in more detail in U.S. patent applications Serial Numbers 547,304; 635,595; 635,613; now U.S. Patent 2,862,972 and Serial No. 679,541. The polythioethers produced in the U.S. patent applications are incorporated into the present specification by reference. The polythioethers having terminal hydroxyl groups which are to be used in the invention are polythioethers having a mean molecular weight of 700 and preferably a molecular weight of from 1500 to 2500.

Any suitable organic polyisocyanate may be used in the invention. Examples of such suitable organic polyisocyanates are 3,3'-dimethyl-4,4'-diphenyl methane diisocyanate, 3,3',5,5'-tetramethyl-4,4'-diphenyl methane diisocyanate, 3,3'-diethyl-4,4'-diphenyl diisocyanate, 1-methyl-3,5-diethyl-2,4-diisocyanato-benzene, 2,5-diethyl-p-phenylene diisocyanate, 3,3'-dianisidine-diisocyanate, and 3,3'-dicyclohexyl diphenyl methane-4,4'-diisocyanate, and the like.

Any suitable compound having at least two hydrogen atoms capable of reacting with isocyanate groups and having a molecular weight lower than 500 may be used as the chain extender compound in the present invention. The chain extender compound reacts with the (—NCO) terminated isocyanate modified polythioether to extend the length of the polymer chain. One of the reactive hydrogen atoms of the chain extender reacts with the isocyanate terminated prepolymer leaving an additional hydrogen atom available for reaction in a cross-linking reaction. Water may also be used as a chain extender and in place of reacting with an isocyanate group to add an additional organic radical to the polymeric chain, the water forms a urea linkage with two isocyanate groups thereby causing two prepolymer molecules to join together through a urea linkage. Examples of such chain extender compounds which may be used are, for example, water, alkylene glycols, such as, for example, butanediol, alkylene polyhydric compounds, such as, for example, trimethylol propane, alkylene glycols having urea, urethane, carbonamide and ester groups, and also alkylene glycols having tertiary nitrogen atoms, and the like. Also, aromatic chain extenders may be used, such as, for example, aromatic glycols, such as, 1,5-naphthalene-β-dihydroxyethyl ether, aromatic diamines, such as, o-dichlorobenzidine, 2,5-dichloro-p-phenylene diamine and 3,3'-dichlorodiaminodiphenyl methane and the like.

Any suitable organic polyisocyanate may be used in the cross-linking reaction. Examples of such suitable organic polyisocyanates are the organic polyisocyanates used in the chain extender reaction with the polythioether. Other organic polyisocyanates may also be used, such as, for example, p-phenylene diisocyanate, 4,4'-diphenyl methane diisocyanate, 1,5-naphthalene diisocyanate, benzidine diisocyanate, toluylene diisocyanate and mixtures thereof or the like. If toluylene diisocyanate is to be used, a convenient method of adding it is in the form of the dimer, such as, for example, the dimer of 2,4-toluylene diisocyanate. Polyisocyanates may also be used in the form of blocked or masked diisocyanates which liberate reactive isocyanate groups when heated. The masked isocyanates may be prepared by reacting an organic diisocyanate, such as, for example, toluylene-2,4-diisocyanate or 1,5-naphthalene diisocyanate or any other suitable organic diisocyanate with a phenol, naphthol, aromatic amine, oxime, imide or other suitable compound.

Any suitable fillers may be used according to the invention. Particularly to be mentioned are the active fillers such as carbon black, iron oxide or siliceous chalk and plasticisers like phthalic acid ester, adipic acid ester, thiodibutyric acid ester or tricresyl phosphate. The mechanical properties of the elastomeric materials obtained according to the process are particularly improved by the concurrent use of acid carbon blacks.

Because of their good mechanical properties and excellent resistance to cold and their high chemical resistance the elastomeric plastics prepared by the process of the invention are especially suitable for the production of elastomeric technical articles, for example, packings, buffers, elastic foils, flexible tubes, tire protectors and the like.

In order to better describe and further clarify the invention, the following are specific embodiments thereof:

*Example 1*

About 2000 g. of a polythioether prepared by self-condensation of thiodiglycol and having an OH number of about 53.5 are reacted for about 20 to about 30 minutes at a temperature of from about 100° to about 120° C. with about 275 g. of 1-methyl-3,5-diethyl-2,4-diisocyanatobenzene. The reaction product is then allowed to cool to about 90° C. and about 40 g. of water are then added and stirred until the reaction product starts to foam rapidly. The reaction product is then poured into a heated waxed mold and heated for about 4 hours at about 100° C.

About 400 g. of an acid carbon black and about 120 g. of dimeric toluylene diisocyanate are incorporated by rolling on a rubber roller into about 1000 g. of the intermediate reaction product thus obtained. The reaction product is stable under storage and suitable for rolling. The reaction mixture is then pressed for about 30 minutes at about 140° C. After final heating for about 4 hours at about 100° C., the test plate which is obtained shows the following mechanical properties:

| | |
|---|---:|
| Tensile strength_____kg./cm.$^2$__ | 214 |
| Breaking elongation_____percent__ | 420 |
| Shore hardness_____degree__ | 87 |
| Elasticity _____percent__ | 49 |
| Permanent elongation_____percent__ | 15 |
| Resistance to tearing by needle test_____kg./cm__ | 115 |
| Resistance (according to Graves) to further tearing kg./cm__ | 82 |

*Example 2*

About 500 g. of an acid carbon black and about 8 percent by weight of 4,4'-diphenyl methane diisocyanate are incorporated by rolling into about 1000 g. of the stable intermediate product prepared according to Example 1. The test plate obtained after pressing at about 140° C. and final heating to about 100° C. for about 4 hours has the following mechanical properties:

| | |
|---|---:|
| Tensile strength_____kg./cm.$^2$__ | 248 |
| Breaking elongation_____percent__ | 535 |
| Shore hardness_____degree__ | 80 |
| Elasticity _____percent__ | 48 |
| Permanent elongation_____do____ | 8 |
| Resistance to tearing by needle test_____kg./cm__ | 120 |
| Resistance (according to Graves) to further tearing kg./cm__ | 77 |

*Example 3*

About 1000 g. of a polythioether having an OH number of about 58 which is prepared by self-condensation of thiodiglycol are reacted at about 95° C. with about 175 g. of 1,3-dimethyl-2,4-isocyanato benzene. After about 30 minutes, about 20 g. of water are stirred into the reaction mixture which is left for about 12 hours at a temperature of about 110° C.

Into about 500 g. of the storage stable and rollable prepolymer thus obtained are incorporated by rolling about 20 g. of 4,4'-diphenylmethane diisocyanate and about 150 g. of a silicic acid which had been precipitated in an acidic medium. The mixture is then pressed for about 30 minutes at 130° C. After final heating for about 4 hours at a temperature of about 100° C., the test plate which is obtained shows the following mechanical properties:

| | |
|---|---:|
| Tensile strength_____kg./cm.$^2$__ | 210 |
| Breaking elongation_____percent__ | 720 |
| Shore hardness_____degree__ | 76 |
| Elasticity _____percent__ | 53 |
| Permanent elongation_____do____ | 12 |
| Resistance to tearing by needle test_____kg./cm__ | 65 |
| Resistance (according to Graves) to further tearing kg./cm__ | 58 |

Example 4

About 4000 g. of a polythioether prepared according to Example 1 are dehydrated for half an hour at a temperature of about 130° C. The dehydrated polythioether is then reacted with about 610 g. of a mixture of 70% 2,4-toluylene diisocyanate and 30% 2,6-toluylene diisocyanate. The reaction mixture is then allowed to cool to about 100° C. and about 114 g. of 4-chloro-1,3-phenylene diamine are added to the reaction mixture. The diamine has been dissolved in 2000 g. of the polythioether prepared according to Example 1. The reaction mixture is then stirred until a crumbly material is obtained and then this material is finally heated for about 7 hours at about 100° C. A material which can be rolled satisfactorily and which is stable under storage is produced.

About 400 g. of carbon black and about 80 g. of 1-methyl-3,5-diethyl-2,4-diisocyanato benzene are incorporated by rolling into about 1000 g. of this storage stable product. After being pressed at a temperature of about 135° C. and heated for about 8 hours at about 100° C. the following mechanical values are shown by a test plate:

| | |
|---|---|
| Tensile strength _____ kg./cm.² | 209 |
| Breaking elongation _____ percent | 520 |
| Shore hardness _____ degree | 75 |
| Elasticity _____ percent | 47 |
| Permanent elongation _____ do | 14 |
| Resistance to tearing by needle test _____ kg./cm. | 96 |
| Resistance (according to Graves) to further tearing kg./cm. | 72 |

Example 5

About 1600 g. of a polythioether prepared according to Example 1 are dehydrated for half an hour at a temperature of about 130° C. The polythioether is then reacted with about 242 g. of a mixture of about 70% 2,4-toluylene diisocyanate and about 30% 2,6-toluylene diisocyanate. The reaction mixture is then allowed to cool to about 100° C. and about 80 g. of 4,4'-diamine diphenyl sulphone are added to the reaction mixture. The diamine has been dissolved in about 800 g. of the polythioether prepared according to Example 1. The reaction mixture is then stirred until a crumbly material is obtained. This crumbly material is then heated for about 7 hours at a temperature of about 100° C. and yields a material which can be rolled satisfactorily and is stable under storage.

About 400 g. of carbon black and about 90 g. of 3,3'-dimethyl-diphenylmethane-4,4'-diisocyanate are incorporated by rolling into about 1000 g. of this storage stable material. After being pressed at about 135° C. and heated for about 8 hours at a temperature of about 100° C., the following mechanical values are shown by a test plate:

| | |
|---|---|
| Tensile strength _____ kg./cm.² | 202 |
| Breaking elongation _____ percent | 510 |
| Shore hardness _____ degree | 78 |
| Elasticity _____ percent | 48 |
| Permanent elongation _____ do | 12 |
| Resistance to tearing by needle test _____ kg./cm. | 96 |
| Resistance (according to Graves) to further tearing kg./cm. | 48 |

It is to be understood that any of the organic polyisocyanates or polythioethers or chain extender compounds or cross-linking compounds disclosed as operable herein may be substituted in the foregoing working examples for those specific compounds used.

Although the invention has been described in considerable detail in the foregoing examples, for the purpose of illustration, it is to be understood that such detail is solely for this purpose and that variations can be made therein by those skilled in the art without departing from the spirit and scope of the invention except as set forth in the claims.

We claim:

1. In the preparation of elastomeric polyurethanes by a process which comprises reacting an organic polyisocyanate with a polythioether, the improvement which comprises reacting a polythioether having terminal hydroxyl groups and an hydroxyl number of from about 10 to about 200 with an aromatic hydrocarbon polyisocyanate having a radical selected from the group consisting of alkyl, cycloalkyl and alkoxy radicals in the ortho position to each of the isocyanate groups of the said polyisocyanate.

2. The process of claim 1, wherein said aromatic hydrocarbon polyisocyanate is 3,3'-dimethyl-4,4'-diphenyl methane diisocyanate.

3. The product obtained by the process of claim 1.

References Cited in the file of this patent

UNITED STATES PATENTS

| | | |
|---|---|---|
| 2,862,972 | Holtschmidt et al. | Dec. 2, 1958 |
| 2,917,489 | Gladding et al. | Dec. 15, 1959 |

FOREIGN PATENTS

| | | |
|---|---|---|
| 779,806 | Great Britain | July 24, 1957 |
| 1,128,561 | France | Aug. 27, 1956 |
| 1,007,502 | Germany | May 2, 1957 |

OTHER REFERENCES

Windemuth: German application Serial No. F 16,475, printed July 5, 1956 (Kl. 39b 22.04).